United States Patent
Nuttall et al.

(10) Patent No.: US 11,601,194 B2
(45) Date of Patent: *Mar. 7, 2023

(54) COORDINATED SATELLITE AND TERRESTRIAL CHANNEL UTILIZATION

(71) Applicant: Skylo Technologies, Inc., Palo Alto, CA (US)

(72) Inventors: Andrew Nuttall, Mountain View, CA (US); Meghna Agrawal, Cupertino, CA (US); Vijay Lewis, Wylie, TX (US)

(73) Assignee: Skylo Technologies, Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,098

(22) Filed: Jan. 24, 2022

(65) Prior Publication Data
US 2022/0294526 A1     Sep. 15, 2022

Related U.S. Application Data

(63) Continuation of application No. 17/200,847, filed on Mar. 14, 2021, now Pat. No. 11,277,201.

(51) Int. Cl.
*H04B 7/185* (2006.01)
*H04W 56/00* (2009.01)

(52) U.S. Cl.
CPC ..... *H04B 7/18523* (2013.01); *H04B 7/18519* (2013.01); *H04W 56/0045* (2013.01)

(58) Field of Classification Search
CPC .......... H04B 7/185–195; H04W 56/00; H04W 56/0045
See application file for complete search history.

(56) References Cited

U.S. PATENT DOCUMENTS

| 5,625,868 A | 4/1997 | Jan et al. |
| 6,011,951 A | 1/2000 | King et al. |
| 6,892,068 B2 * | 5/2005 | Karabinis .......... H04B 7/18539 455/448 |
| 7,149,526 B2 | 12/2006 | Karabinis et al. |
| (Continued) | | |

OTHER PUBLICATIONS

Notification of transmittal of the international search report and the written opinion of the international searching authority, or the declaration; International application No. PCT/US2022/070143; dated Feb. 4, 2022.

*Primary Examiner* — Raymond S Dean
(74) *Attorney, Agent, or Firm* — Brian R. Short

(57) ABSTRACT

Apparatuses, methods, and systems for coordinated satellite and terrestrial channel utilization, are disclosed. One wireless system includes a plurality of base stations, a plurality of hubs, and a controller. For an embodiment, the controller is operative to determine discrete communication delays for each base station based upon a maximum propagation delay between each base station and the one or more of the plurality of hubs, generate a channel sharing map that includes a timing of communication between each base station and the one or more of the plurality of hubs, communicate the channel sharing map to the plurality of base stations. Further, each of the plurality of base stations operates to time wireless communication with the plurality of hubs based on the channel sharing map, the discrete communication delays of the base station, and a communication delay of a preceding base station according to the channel sharing map.

20 Claims, 10 Drawing Sheets

(56) References Cited

U.S. PATENT DOCUMENTS

| | | | | |
|---|---|---|---|---|
| 7,593,724 | B2* | 9/2009 | Karabinis | H04B 7/216 455/12.1 |
| 7,599,656 | B2* | 10/2009 | Karabinis | H04B 7/18543 455/12.1 |
| 7,636,566 | B2* | 12/2009 | Karabinis | H04B 7/18563 455/12.1 |
| 7,636,567 | B2 | 12/2009 | Karabinis et al. | |
| 7,933,552 | B2* | 4/2011 | Karabinis | H04B 7/18563 455/12.1 |
| 8,121,605 | B2 | 2/2012 | Monte et al. | |
| 11,095,361 | B2* | 8/2021 | Eichen | H04B 7/18513 |
| 11,277,201 | B1* | 3/2022 | Nuttall | H04W 56/0045 |
| 2002/0089946 | A1* | 7/2002 | Hutchings | H04B 7/2125 370/278 |
| 2008/0247372 | A1* | 10/2008 | Chion | H04W 72/005 370/338 |
| 2013/0315112 | A1* | 11/2013 | Gormley | H04B 7/18539 370/280 |
| 2016/0044605 | A1* | 2/2016 | Vajapeyam | H04W 76/28 370/311 |
| 2021/0058149 | A1* | 2/2021 | Nuttall | H04B 7/1555 |
| 2021/0144721 | A1* | 5/2021 | Kurth | H04W 4/80 |

\* cited by examiner

```
┌─────────────────────────────────────────────────────────────────────────┐
│ Determining, by a controller, one or more discrete communication delays │
│ for each base station based upon a maximum propagation delay between    │
│ each base station and the one or more of the plurality of hubs          │
│                                                                         │
│                                  1010                                   │
└─────────────────────────────────────────────────────────────────────────┘
                                      │
                                      ▼
┌─────────────────────────────────────────────────────────────────────────┐
│ Generating, by the controller, a channel sharing map that includes a    │
│ timing of communication between each base station and the one or more   │
│ of the plurality of hubs                                                │
│                                                                         │
│                                  1020                                   │
└─────────────────────────────────────────────────────────────────────────┘
                                      │
                                      ▼
┌─────────────────────────────────────────────────────────────────────────┐
│ Communicating, by the controller, the channel sharing map to the        │
│ plurality of base stations                                              │
│                                                                         │
│                                  1030                                   │
└─────────────────────────────────────────────────────────────────────────┘
                                      │
                                      ▼
┌─────────────────────────────────────────────────────────────────────────┐
│ Timing, by each of the plurality of base stations, wireless             │
│ communication with the plurality of hubs based on the channel sharing   │
│ map, the one or more discrete communication delays of the base station, │
│ and a communication delay of a preceding base station according to the  │
│ channel sharing map                                                     │
│                                                                         │
│                                  1040                                   │
└─────────────────────────────────────────────────────────────────────────┘
```

Figure 10

COORDINATED SATELLITE AND TERRESTRIAL CHANNEL UTILIZATION

RELATED APPLICATIONS

This patent application in a continuation of U.S. patent application Ser. No. 17/200,847, filed Mar. 14, 2021, which is herein incorporated by reference.

FIELD OF THE DESCRIBED EMBODIMENTS

The described embodiments relate generally to wireless communications. More particularly, the described embodiments relate to systems, methods and apparatuses for coordinated satellite and terrestrial channel utilization.

BACKGROUND

The Internet of Things (IoT) includes large numbers of devices being connected to the internet. The devices can be located in remote places all over the world.

It is desirable to have methods, apparatuses, and systems for coordinated satellite and terrestrial channel utilization.

SUMMARY

An embodiment includes a controller of a wireless communication system. For an embodiment, the controller is operative to (or configured to) determine one or more discrete communication delays for each base station of a plurality of base stations based upon a maximum propagation delay between each base station and one or more of a plurality of hubs, generate a channel sharing map that includes a timing of communication between each base station and the one or more of the plurality of hubs, communicate the channel sharing map to the plurality of base stations. Further, each of the plurality of base stations operates to time wireless communication with the plurality of hubs based on the channel sharing map, the one or more discrete communication delays of the base station, and a communication delay of a preceding base station according to the channel sharing map.

Another embodiment includes a method. The method includes determining, by a controller, one or more discrete communication delays for each base station based upon a maximum propagation delay between each base station and the one or more of the plurality of hubs, generating, by the controller, a channel sharing map that includes a timing of communication between each base station and the one or more of the plurality of hubs, communicating, by the controller, the channel sharing map to the plurality of base stations, and timing, by each of the plurality of base stations, wireless communication with the plurality of hubs based on the channel sharing map, and the one or more discrete communication delays of the base station.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 10 is a flow chart that includes steps of coordinated satellite and terrestrial channel utilization, according to an embodiment.

DETAILED DESCRIPTION

The embodiments described include methods, apparatuses, and systems for coordinated satellite and terrestrial channel utilization. Channel utilization is controlled by determining channel sharing maps based on overlapping coverage areas of multiple base stations. The determined channel sharing maps are provided to the multiple base stations. Each of the multiple base stations control timing of wireless communication with hubs within the coverage areas of the multiple base stations based on one or more discrete communication delays of the base station, and a communication delay of a preceding base station according to the channel sharing map.

Figure 1:
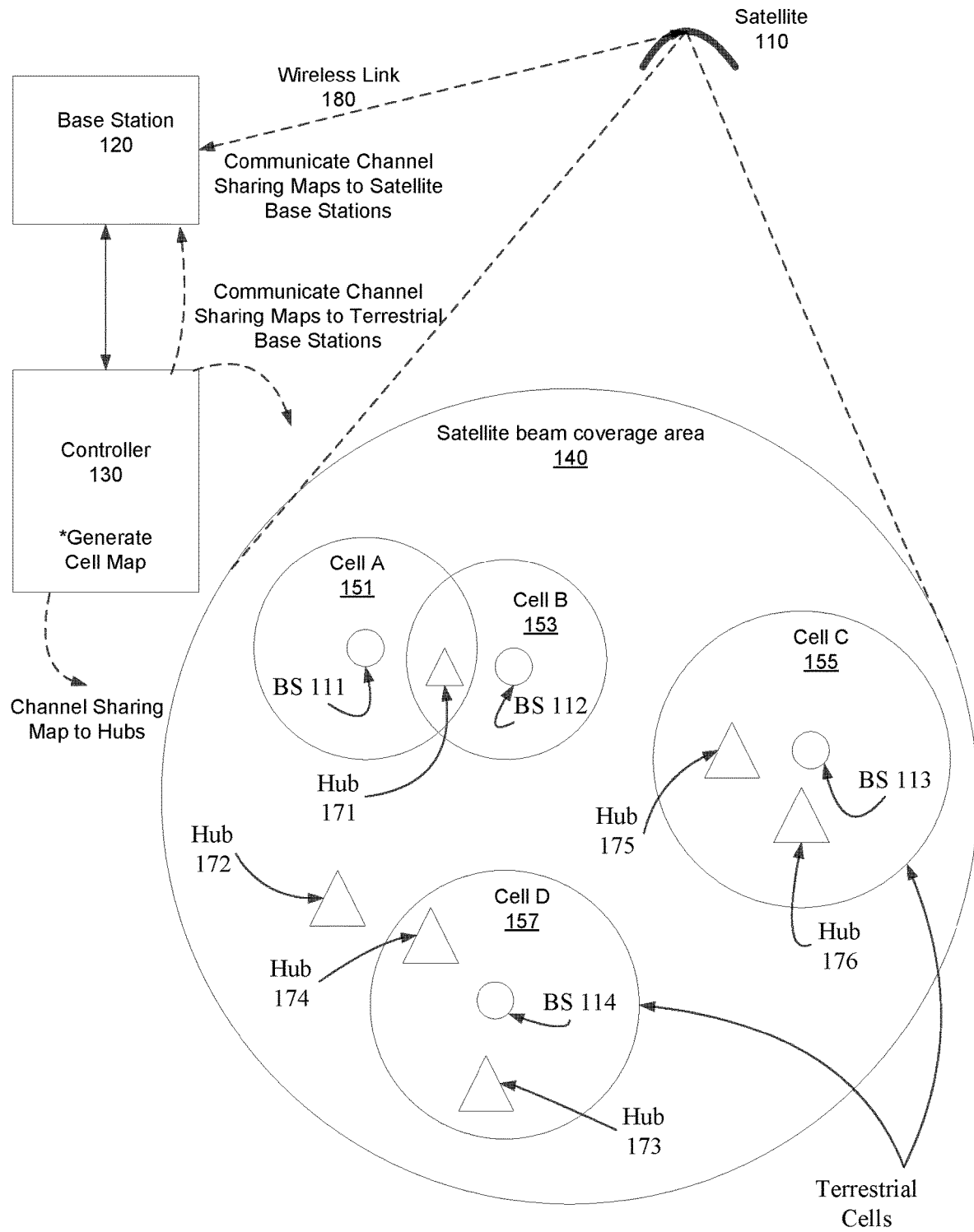
FIG. 1 shows wireless communication system that includes a satellite base station wirelessly communicating with a plurality of hubs through a satellite, wherein terrestrial base stations are located within a coverage area of the satellite base station, according to an embodiment.

FIG. 1 shows wireless communication system that includes a satellite base station 120 wirelessly communicating with a plurality of hubs 171-176 through a wireless link 180 and through a satellite 110, wherein terrestrial base stations 111-114 are located within a coverage area 140 of the satellite base station 120, according to an embodiment. For an embodiment, a controller 130 operative to determining one or more discrete communication delays for each base station 111-114, 120 based upon a maximum propagation delay between each base station 111-114, 120 and the one or more of the plurality of hubs 171-176.

For an embodiment, the maximum propagation delay for a base station is determined by measuring roundtrip delay times between the base station and all hubs wirelessly connected to the base station. For an embodiment, the maximum propagation delay for a base station is estimated based on a location of satellite that completes a wireless link between the base station and hubs, a location of base station and base station (satellite) coverage area.

In implementation, the maximum propagation delay captures 95% of the likely use cases of the described embodiments. For at least some embodiments, the maximum propagation delay is used as a mechanism to ensure that all hubs coordinate with each other when transmitting data so that collisions do not happen at the (receiving) base station. With a maximum propagation delay, each hub ensures that its actual delay is that number (the maximum propagation delay) by holding onto (holding off transmission) their messages (packets or data for wireless transmission) for long than needed.

It is to be realized that there may be other mechanisms utilized to try to ensure collision avoidance that don't use the maximum propagation delay. One example includes setting discrete delay timing blocks and forcing all hubs to adhere to one or more of the discrete delay timing blocks.

An embodiment includes determining one or more discrete communication delays for each base station based upon a maximum propagation delay between each base station and the one or more of the plurality of hubs. For an embodiment the discrete communication delay is the maximum propagation delay. For an embodiment the discrete communication delay is longer than the maximum propagation delay. For an embodiment the discrete communication delays are based upon the plurality of propagation delays between the hubs and the base station and are aligned according to a base station frame structure.

As stated, the one or more discrete communication delays for each base station 111-114, 120 is determined based upon a maximum propagation delay between each base station 111-114, 120 and the one or more of the plurality of hubs 171-176. For an embodiment, the one or more discrete communication delays are equal to or less than the maximum propagation delay for each base station.

For an embodiment, the controller 130 is further operative to generate a channel sharing map that includes a timing and order of communication between each base station and the one or more of the plurality of hubs. For an embodiment, the channel sharing map includes timings and sequence or order of wireless communication between each base station 111-114, 120 and the one or more of the plurality of hubs 171-176.

For at least some embodiments, multiple unique channel sharing maps are created. For an embodiment, a different channel sharing maps are created for each base station having a different overlapping coverage area, wherein the overlapping coverage area is determined by the overlapping coverage areas the base stations.

For an embodiment, the controller 130 communicates the channel sharing map(s) to the plurality of base stations 111-114, 120. Further, for an embodiment, the controller additionally or alternatively communicates the channel sharing map(s) with the plurality of hubs 171-176.

For an embodiment, each of the plurality of base stations 111-114, 120 operate to (or are configured to) time wireless communication with the plurality of hubs 111-114, 120 based on the channel sharing map, the one or more discrete communication delays of the base station, and a communication delay of a preceding base station according to the channel sharing map. For an embodiment, the timing of the wireless communication from each of the base station provides continuity of forward carrier or downlink communication (base station to hub) reception by the hubs. The delay of communication from different base stations to different hubs varies. Accordingly, each base station controls the timing of downlink communication to hubs to optimize (or improve) utilization of the communication channel used for the downlink communication. For an embodiment, the preceding base station is the base station wirelessly communicating with the one of the plurality of hubs immediately before the base station wirelessly communicates with the one of the plurality of hubs. For an embodiment, the preceding base station is identified based on the order or sequence of the base stations included within the channel sharing map.

As shown, for an embodiment, at least one of the plurality of base stations (base station 120) communicates with at least one of the plurality of hubs 171-176 through a satellite network (through satellite 110), and/or at least one of the plurality of base stations 111-114 communicates with at least one of the plurality of hubs 171-176 through a terrestrial network. For an embodiment, the plurality of base stations is a part of satellite networks. For an embodiment, the plurality of base stations are a part of satellite and terrestrial networks. For an embodiment, at least one of the base stations are part of a GEO (geosynchronous) satellite network, and at least one other of the base stations are part of a LEO (low earth orbit) satellite network. The difference in lengths of the wireless links of the different satellite network is very large, and as a result, the roundtrip delays (propagation delays) between the hubs and the base stations of the different network varies by large amounts of time. Accordingly, channel utilization is improved by using the described embodiments for timing transmission of wireless communication between the base stations and the hubs.

As described, the satellite network includes a directional wireless beam from the satellite 110 that has a physical coverage area 140. Further, each of the terrestrial base stations 111-114 have corresponding coverage areas 151, 153, 155, 157 the overall with the coverage area 140 of the satellite network. Further, coverage areas of the terrestrial network can overlap each other (such as, coverage areas 151, 153). Further, coverage areas of separate satellite networks can overlap with each other (not shown in FIG. 1).

The wireless links between the hubs 171-176 and the base station 120 of the satellite network are substantially longer than the wireless links between the terrestrial base stations 111-114 and the hubs 171-176, and therefore, wireless communication signals traveling through the wireless links of the satellite network have a much longer propagation time. Accordingly, in order to efficiently utilize the available wireless communication channel, the timing of transmission between the hubs 171-176 and the base stations 111-114, 120 should be controlled. The described embodiments provide coordinated satellite and terrestrial channel utilization when the maximum propagation delays of the plurality of base stations varies across the plurality of base stations with overlapping coverage areas by greater than a threshold amount. The roundtrip delays between hubs and terrestrial base stations, and between hubs and satellite base stations are greater than the threshold amount.

For an embodiment, the controller further operates to communicates the channel sharing map to one of more of the plurality of hubs 171-176 through at least one of the base stations 111-114, 120. For an embodiment, the controller operates to control at least one of the plurality of base stations 111-114, 120 to broadcast the channel sharing map to one of more of the plurality of hubs 171-176 through at the least one of the base stations 111-114, 120. Once the broadcast has been received by the hubs 171-176, the hubs are able to properly time reception of wireless signals from the different base stations 111-114, 120.

Figure 2:
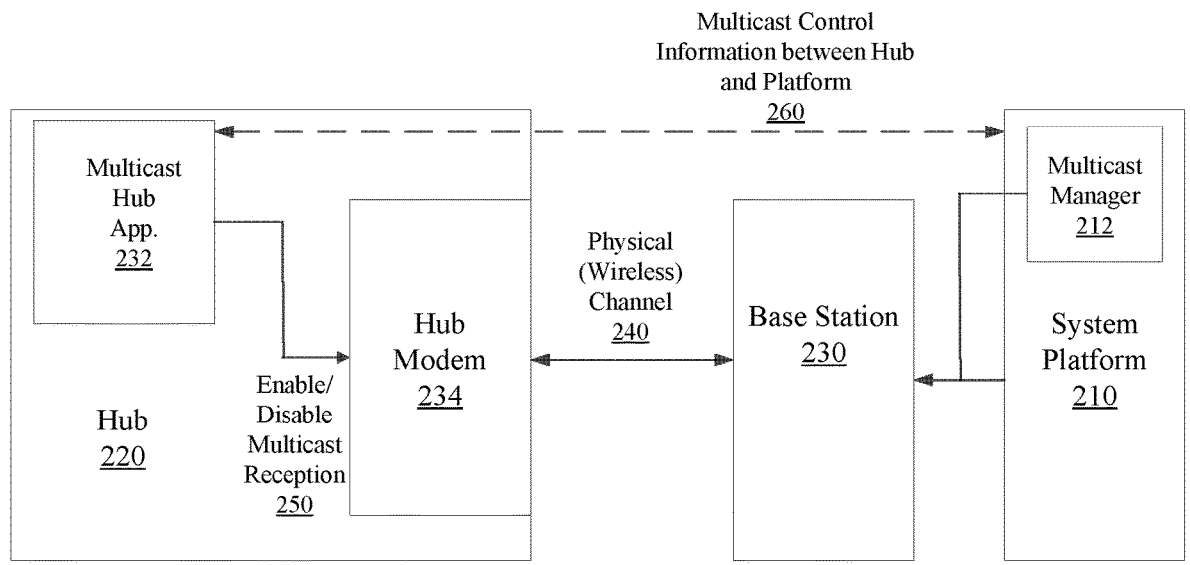
FIG. 2 shows a physical channel between a hub modem of a hub and a base station, and a virtual channel between an application of the hub and a system platform, according to an embodiment.

FIG. 2 shows a physical channel 240 between a hub modem 234 of a hub 220 and a base station 230, and a virtual channel 260 between an application 232 of the hub 220 and a system platform 210, according to an embodiment. For an embodiment, a multicast manager 212 of the system platform 210 generates a multicast scheduling control packet based upon a distribution of a plurality of network registered hubs. The distribution of the network registered hubs can be based on a distribution of channel sharing maps, of firmware operating on the hubs, the distribution of customers of the hubs, a distribution of application of use of the hubs, and/or based on the distribution of the geography of the hubs. The application 232 controls enabling or disabling of the multicast reception 250 of the hub modem 234.

For an embodiment, the system platform 210 communicates the multicast scheduling control packet to the base station 230. For an embodiment, the base station 230 generates a plurality of multicast channel configurations based upon the multicast scheduling control packet.

Further, for an embodiment, system platform 210 also communicates the multicast scheduling control packet to the wireless communication hub 234, wherein the wireless communication hub 234 is one of the plurality of network registered hubs. For an embodiment, the system platform 210 communicates the multicast scheduling control packet to the wireless communication hub 234 through the base station 230. However, the multicast scheduling control packet does not have to be communicated to the wireless communication hub 234 through the base station 230. That is, for example, the system platform 210 may communicate the multicast scheduling control packet to the wireless communication hub 234 through another means. For example, a cellular or other wireless network (not shown in FIG. 2) can be utilized to facilitate this communication.

After having received the multicast scheduling control packet from the system platform 210, the wireless communication hub 234 selects specific multicast channels from the plurality of multicast channel configurations, to receive specific multicast data based upon a condition of the hub and the multicast scheduling control packet. That is, the multicast scheduling control packet includes multicast channel configurations of which the wireless communication hub 234 makes a selection. For an embodiment, the selection is based on a condition of the wireless communication hub 234, wherein the condition is based on a configuration of the wireless communication hub 234, an environment of the wireless communication hub 234, the wireless coverage area attachment of the wireless communication hub 234, or a position of the hub within the channel sharing map. For at least some embodiments, the configuration includes a current firmware version of the hub. For at least some embodiments, the configuration includes a hub battery status. For at least some embodiments, the configuration includes a subscription of the hub of certain multicast services. For at least some embodiments, the configuration includes a customer ID of the hub. For at least some embodiments, the configuration includes a multicast channel priority specified in the multicast channel configuration. For at least some embodiments, the environment includes a location of the hub.

After having selected the specific multicast channels, the wireless communication hub 234 then receives the multicast data through the selected specific multicast channel configurations.

For another embodiment, before having received a channel sharing map, the hubs operate in a higher power consumption state as the hubs wait for the channel sharing map to be broadcast from the base stations. Once the hubs have received the channel sharing maps, the hubs can synchronize with one or more of the base stations, and the hubs have the information needed to know when communication with each of the hubs is to occur, and the hubs can then switch to a lower-power consumption state as the hubs do not need to be operating when not wirelessly communicating with the base stations.

For at least some embodiments, once the plurality of hubs 171-176 has received the channel sharing map, each of the plurality of hubs 171-176 operate to coordinate a timing of uplink wireless communication to the base stations 111-114, 120 based upon the one or more discrete communication delays, a propagation delay of a one of the base stations 111-114, 120, and the shared channel map. The coordination of timing of the uplink wireless transmission (from the hubs to the base stations 111-114, 120) has the purpose of avoiding interference at the base stations 111-114, 120 in the return or uplink direction.

An embodiment further includes at least one of the plurality of hubs 171-176 operating to maintain an estimate of roundtrip time for each base station that the hub is within the base station coverage area. That is, each hub 171-176 is within the wireless coverage area of one or more base stations. For this embodiment, each hub 171-176 maintains an estimate of the roundtrip delay between the hub and each of these base stations the hub can maintain wirelessly communication because the hub is within the wireless coverage area of the base station. For an embodiment, the at least one of the plurality of hubs further operates to time communication with a current active base station based on the maintained estimate of the roundtrip delay with the current active base station and the channel sharing map. It is to be understood that the term roundtrip delay and propagation delay may be used interchangeably.

Further, for an embodiment, at least one of the plurality of hubs 171-176 maintains an estimate of frequency correction values needed to phase lock onto carriers of multiple base stations 111-114, 120. That is, the at least one of the plurality of hubs operates to select a frequency correction value based on the maintained estimates of the frequency correction values of a current active base station as identified by the channel sharing map. A frequency correction value needed by the hub to lock (frequency or phase lock) to each of the base stations the hubs can wirelessly communicate with, is maintained. The channel sharing map provides the hub with the information needed to project which base station the hub will connect with at different times. The hub then accesses the maintained frequency correction value needed to lock to the base station as indicated by the channel sharing map.

For an embodiment, each of the hubs maintains physical channel properties for the base stations identified by the channel sharing map. For an embodiment, the physical channel properties include but are not limited to a channel frequency response, a channel path loss, a doppler shift, multi-path delay and/or received signal strength. Further, for an embodiment, the physical channel properties maintained as a function of time. For an embodiment, the saved physical channel properties are used by the hubs to minimize the synchronization time with the base station identified based on channel sharing map.

For an embodiment, the base stations of the channel sharing map can each have different data transmission capacity and latency. For an embodiment, depending on the service provided by the connecting base station, a hub can further prioritize data transmission applications to support. For example, hub can prefer one base station for multicast applications and another base station for unicast applications.

For an embodiment, controller further helps in providing a communication context of a hub to the base station when the hub switches from one base station to another. For an embodiment, based on the channel sharing map, the controller moves the context of the hub from one base station to another. In this way, hubs can get uninterrupted service while switching from one base station to another. For an embodiment, the controller also helps in maintaining context when the hub moves from one base station to another.

For an embodiment, channels of the channel sharing map occupy a common frequency spectrum. Therefore, the channel sharing map provides for improved utilization of the common frequency spectrum by scheduling the time coordinated wireless communication through the common frequency spectrum.

Owing to the timing of wireless communication between the base stations and the hubs, the base stations and the hubs need to be synchronized. For an embodiment, the plurality of base stations and the plurality of hubs maintain synchronization through a global satellite network. That is, the global satellite network provides a signal that can be locked onto by the base stations and the hubs.

For an embodiment, generation of the shared channel map is influenced by the communication delays. For an embodiment, a timing of allocation within the shared channel map is based on (to minimize) a difference in the communication delays between preceding and subsequent base stations of the shared channel map. That is, the ordering of the base stations according to the channel sharing map is selected such that directly successive base stations of the channel sharing map have communication delays that are as similar as conveniently possible. For an embodiment, the generation of the channel sharing map is additionally influenced by a Service Level Agreement (SLA) which minimizes (or reduces) the downtime between carrier switches (that is, minimizes the downtime of the hub(s) when switching from one base station to another base station).

Figure 3:
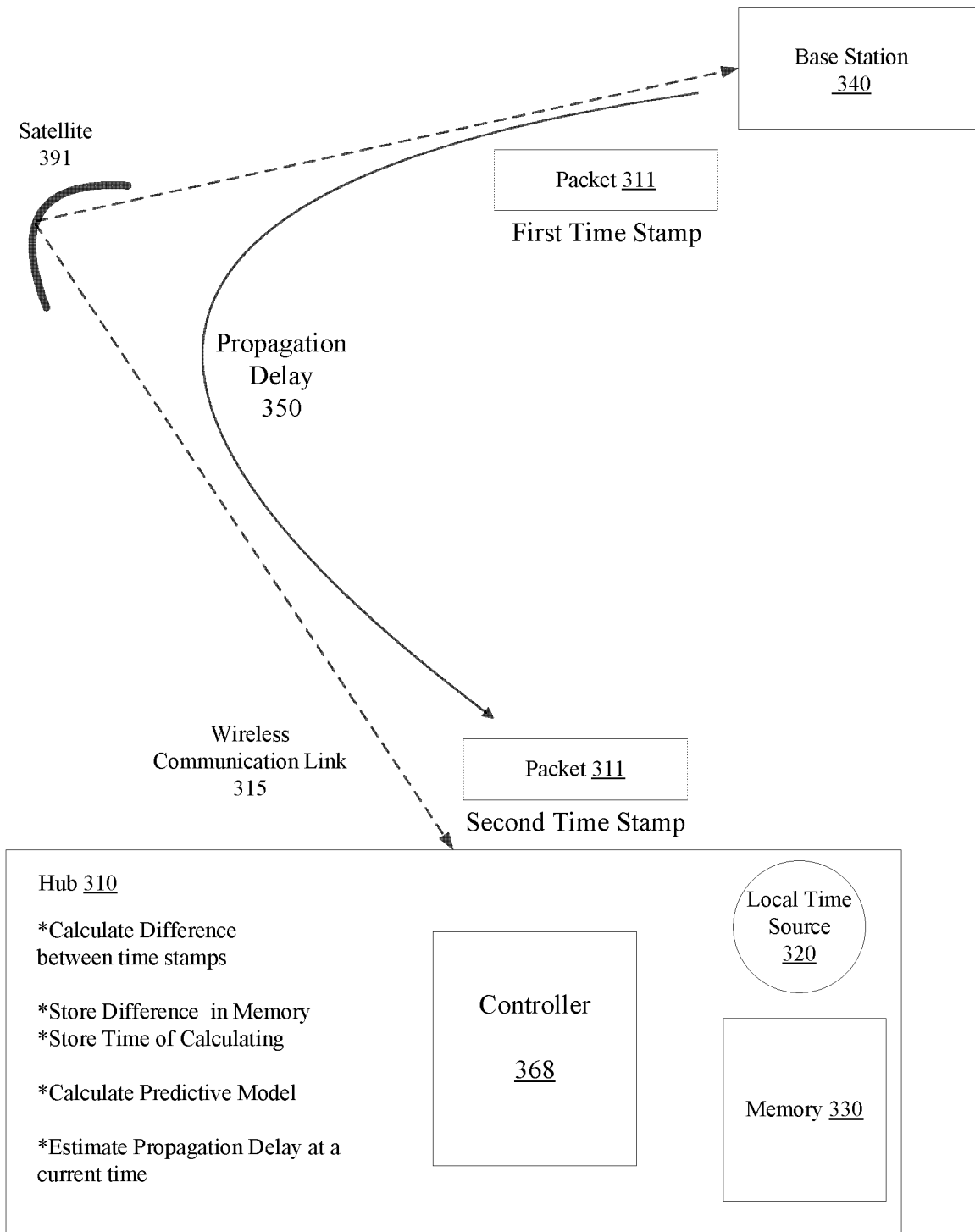
FIG. 3 shows determination of a propagation delay between a base station and a hub, according to an embodiment.

FIG. 3 shows determination of a communication delay between a base station 340 and a hub 310, according to an embodiment. An embodiment includes the base station operating to transmit a packet 311 containing a first timestamp representing a transmit time of the packet. After transmission of the packet 311, the hub 310 receives the packet 311 through the satellite link 315 (including satellite 391) containing the first timestamp. Further, the hub operates to receive from a local time source a second timestamp corresponding with a time of reception of the packet with the first timestamp. The hub then operates to calculating a time difference between the first timestamp and the second timestamp, and a propagation delay 350 of the base station based on the calculated time difference. As previously described, for an embodiment, the base stations determine the communication delays. For an embodiment, the hubs receive the communication delay(s) from the base station(s), and then subtracts from the communication delay the propagation delay, and then holds (delays) any messages (wireless communication) by that additional amount of time between when the hub is scheduled to transmit the message and when the hub actually transmits the message.

For an embodiment, the hub 310 receives the second timestamp from a local source 320 of the hub 310 that corresponds with a time of wireless reception of the first timestamp received from the base station 340. The local source 320 of FIG. 3 is shown as being internal to the hub 310, but the local source 320 does not have to be internal to the hub 310. For an embodiment, a controller 368 of the hub 310 operates to calculate the time difference between the first timestamp and the second timestamp. Further, the controller 368 operates to store the time difference between the first timestamp and the second timestamp in memory 330. For an embodiment, the controller 368 additionally stores a time of the calculating of the time difference.

An embodiment further includes the hub operating to store the time difference between the first timestamp and the second timestamp, calculate a predictive model for predicting the propagation time based the time difference between the first timestamp and the second timestamp, and estimate the propagation time between the base station and the hub at a time, comprising querying the predictive model with the time. For an embodiment, only one predictive model per base station of a shared channel map allocation is queried at a time. For an embodiment, only a live or current predictive model is updated.

For an embodiment, the predictability of propagation delay between the base station and the hub is a function of the frequency of new information being injected into a prediction model. For example, if the system dynamics result in a slowly changing system (that is, slowly changing propagation delay), the model is accurately predictable for lower frequency injections of new pieces of information. The validity/predictability of the propagation delay prediction model is proportionally related to the new information frequency and the rate of change of the system dynamics.

For at least some embodiments, the sampled data injected into the prediction model is 2-dimensional, including the calculated time difference between the first timestamp and the second time stamp, and the time of the calculation of the time difference. The purpose of the two-dimensionality is to accommodate for variance and uncertainty in periodicity of information injection into the propagation delay prediction model. For example, the prediction model may receive 5 consecutive samples, wherein new information is injected every 10 seconds, and for the $6^{th}$ instance there is a 20 second gap.

The internal (predictive) model could take on a number of different forms depending upon the system dynamics in which it is describing. Some models are better suited than others for different real-world systems. Accordingly, at least some embodiments include adaptively selecting a base model based on characteristics of the first time stamp and the second time stamp, and/or other information available related to the propagation delay between the first and hubs.

For an embodiment, the predictive model is as simple as a constant model or passthrough model. For at least some embodiments, queries of the predictive model give that last received time difference.

Depending upon the time number and how recently the time difference calculations are available, the order of the model (that is, how many derivatives or higher power terms) may dynamically vary. In one instance, when a model is first initiated and only one data point is available, the model may utilize a zeroth order estimation technique, however as additional data points become available $1^{st}$, $2^{nd}$ and $3^{rd}$ order terms may be utilized to increase the fidelity of the predictive model and to increase the time-period of validity of the predictive model by capturing higher-order system dynamics. For an embodiment, the frequency of data sampling and model updating can also allow more of the underlying system dynamics to be captured and modeled. This is very much related to Nyquist frequency.

In practicality it is often not easy to know (by the hub) what network time (what time the base station thinks it is). As previously described, wireless communication between the hub and the base station through the wireless link demands synchronization of the hub with the base station. In reality it is not desirable to receive a new timestamp from the base station every X seconds. An embodiment includes the hub (hub) receiving one or more first time timestamps from the base station once, or very infrequently. For an embodiment, the hub then uses well characterized and non-divergent discrete networking timing increment "ticks" to forward integrate network time. For an embodiment, the discrete "tick" comes in the form of the current operating frame number of the system. The challenge is that the frame number can be ambiguous because frame numbers are cyclical (that is, 1 2 3 4 5 . . . 1 2 3 4 5).

For an embodiment the discrete network counting ticks include cyclical frame counters, for this embodiment the first time stamp is estimating by selecting from a group of possible cycle counts a value which produces a propagation time that is within a predefined acceptable value range. Given an expectation around propagation time, there exists a unique solution for how many frame number cycles have occurred over a large, but finite, time period.

Figure 4:
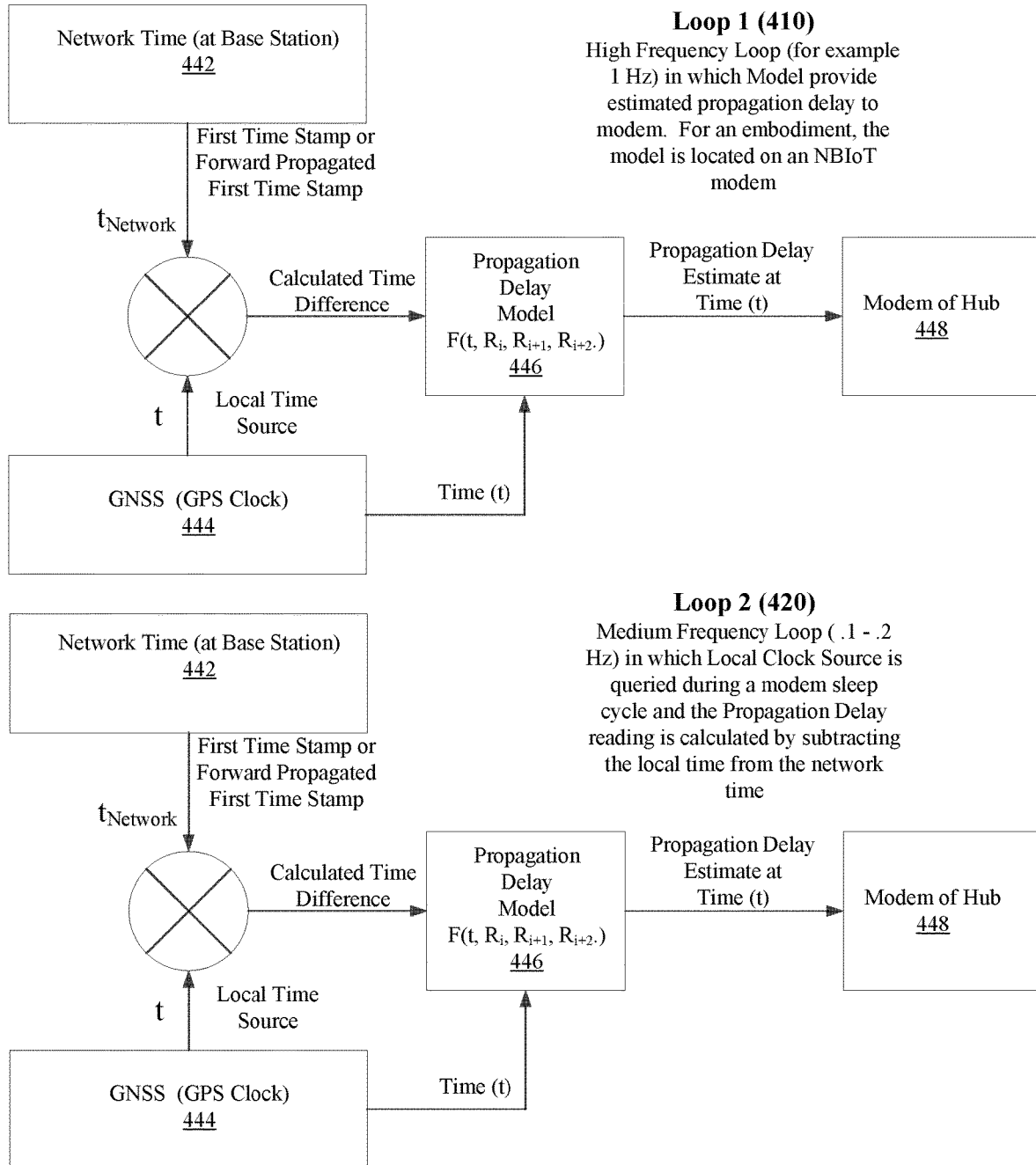
FIG. 4 shows a predictive model for estimating the propagation delay, according to an embodiment.

FIG. 4 show a predictive model of two different control loops 410, 420 for estimating the propagation delay, according to an embodiment.

Predictive Model(s)

Due to the large RTT (propagation delay) drift (up to ~1.2 µs/s) a new RTT must be calculated and sent to the modem of the hub (hub) at a frequency high enough to allow adjustment for drift of the propagation delay between the base station (base station) and the hub (hub). This can place a large burden on the requirement and availability of a GNSS (Global Navigation Satellite System) receiver of, for example, the hub. However, estimation of the RTT drift can be simplified due to the well-behaved and characterizable motion of the satellite within the wireless link between the base station (base station) and the hub (hub).

FIG. 4 shows an embodiment of a nested loop model for RTT calculation (Loop1). For an embodiment, the exterior loop 410 consists of time differences ($R_i$) being calculated by taking the difference between the Network Time 442 (at the base station or base station) and Local Time 444 (at the hub or hub) during an NB-IoT (Narrow Band Internet of Things) modem sleep cycle. For an embodiment, this time delta $R_i$ is sent to a local primitive RTT model 446 (that is, the propagation delay predictive model). For an embodiment, the RTT model 446 provides an equation for the RTT based upon the current GNSS time (0.5 ppm→1 ppm clock drift poses negligible accuracy concerns as an input to the RTT model 446) and a series of the i most recent time deltas. The inner loop 420 consists of the RTT model (executed on NB-IoT chipset) pushing a new RTT to the modem every <1 second. A key observation of this method is that new RTT values can be sent to the modem without the modem going into sleep modem. There is still a freshness requirement on the RTT model which requires new GNSS readings on a periodic basis, but the inclusion of the model reduces the overall sample frequency requirement of the local GNSS and disconnects taking GNSS readings with updating the RTT.

For an embodiment, the modem of the hub (hub) 448 and the GNSS receiver of the hub utilize the same antenna and RF chain within the hub.

For an embodiment, the UE (user equipment) or hub or hub performs a $R_i$ (difference between the first time stamp and the second time stamp) measurement using a GNSS timestamp and network time available from SIB16 and frame counter. For an embodiment, the UE requires c-DRX (3GPP Defined sleep modes) and e-DRX sleep mode (to enable cohabitation between a GNSS receiver and a modem using the same RF chain to support a GNSS measurement. For an embodiment, the frequency of the $R_i$ measurements depends on the sleep cycle. A required sleep duration <10.24 s. (A short sleep cycle is desirable, because sleep cycle duration adds latency to any communications sent across the network. However, the sleep cycle must also be long enough to accurately capture a GNSS reading).

For an embodiment, whenever a TA (timing advance) correction is available from the base station, it should be used to correct the measured delay, in addition it can be used to adjust the frequency of Loop1 410 or loop 2 420 of FIG. 4.

For an embodiment, the RTT (propagation delay) is calculated using the predictive model based upon a finite and limited series of previous $R_i$ measurements. For an embodiment, the predictive model produces an RTT output given an input of current GNSS time. For an embodiment, this process occurs at a high frequency cycle (1 Hz) and can occur even when the modem is not in sleep mode.

Figure 5:
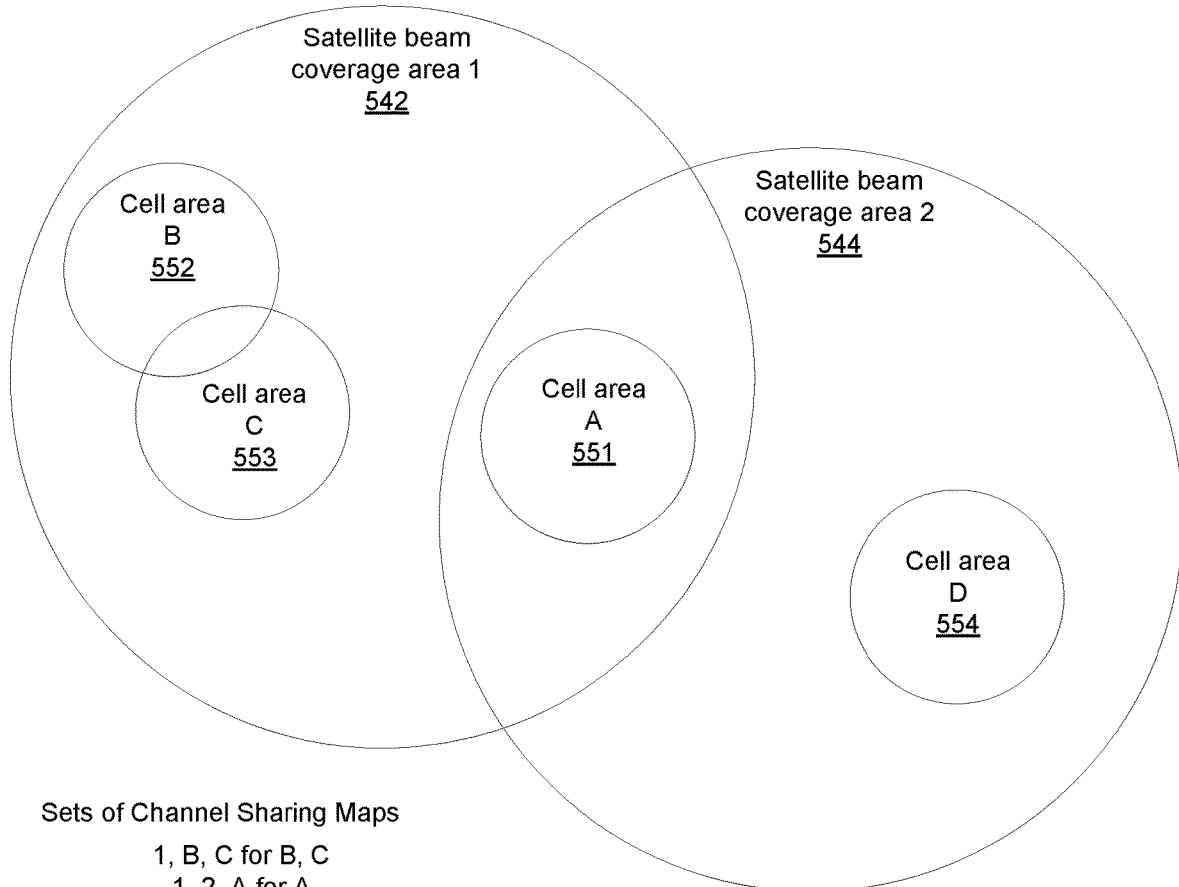
FIG. 5 shows various overlapping coverage areas of satellite base stations and terrestrial (cellular) base stations, according to an embodiment.

FIG. 5 shows various overlapping coverage areas of satellite base stations and terrestrial (cellular) base stations, according to an embodiment. As shown, satellite coverage areas 542, 544 overlap with each other. Further, satellite coverage area 542 overlaps with terrestrial coverage areas 551, 552, 553. Further, at least one terrestrial coverage area 352 overlaps with another terrestrial coverage area 353. Further, satellite coverage area 544 overlaps with terrestrial coverage areas 551, 554.

For an embodiment, each base station has a defined coverage area, and a unique channel sharing map is generated for each set of base stations having uniquely overlapping coverage areas. For an embodiment, a unique channel sharing map is generated for each base station based on one or more other base stations that have an overlapping coverage area with the base station. For example, in FIG. 5, there are five unique channel sharing maps for the different base station having the five uniquely overlapping coverage areas. A first map for the base stations B and C includes timing schedule transmission for the base stations 1, B, C for the overlapping coverage areas of base station 1 and base stations B and C. A second map for the base station A includes timing schedule transmission for the base stations 1, 2, A for the overlapping coverage areas of base stations 1 and 2, and base station A. A third map for the base station D includes timing schedule transmission for the base stations 2, A for the overlapping coverage areas of base station 2, and base station A. A fourth map for the base station 1 includes timing schedule transmission for the base stations 1, 2, A, B, C for the overlapping coverage areas of base stations 1, 2, and base stations A, B and C. A fifth map for the base station 2 includes timing schedule transmission for the base stations 1, 2, A, D for the overlapping coverage areas of base stations 1, 2, and base stations A, and D.

For an embodiment, overlapping coverage areas of the base stations change over time, and the unique channel sharing map is adaptively updated based on the changes in the overlapping coverage areas. For an embodiment, the overlapping coverage areas change as a function of time due to motion of the transmitting elements (for example, satellite motion) and thus the uniquely defined channel sharing maps also change as a function of time.

For an embodiment, the coverage overlaps of the base stations are determined over time. Some examples for determining the coverage overlap include telemetry monitoring of the position, velocity, and orbit of the satellite and propagating that forward in time (for example, 1 week) to generate that unique network map. Further, for at least some embodiments, feedback from the hubs is utilized to determine the coverage overlaps. For example, a received signal strength (RSSI) of signals received at a hub for different base stations can be monitored. The value of the RSSI and changes in the RSSI can be used to further refine the coverage overlaps.

At least some embodiments include a first base station and a second base station sharing core network and traffic from a hub when a wireless connection of the hub dynamically transfers from the first base station to the second base station. For at least some embodiments, the core network includes at least some of the session management, security/ authorization, device provisioning, data routing. The core network allows for transferring between cell towers (base stations) without having to restart a call or wireless connection because the core network does a session handover. For example, the core management manages file transfer and data loss while switching between base stations of two networks. The described embodiments can be utilized to reduce network switchover time to ~1-5 milliseconds which allows avoiding a session interruption by also including the core network to manage the switch over from one network to another network.

It is to be understood that the described embodiments do not ensure complete continuity of reception for all hubs, but rather to reduce the gaps in continuity down to the spread in propagation delay for hubs associated with a single base station. For example, a network that includes both satellite and terrestrial base station may have a maximum round trip time spread different between the satellite base station and the terrestrial base station of 500 milliseconds. However, by using the controlled timing and the channel sharing maps, the realized timing gaps can be reduced to 4 milliseconds.

Figure 6:
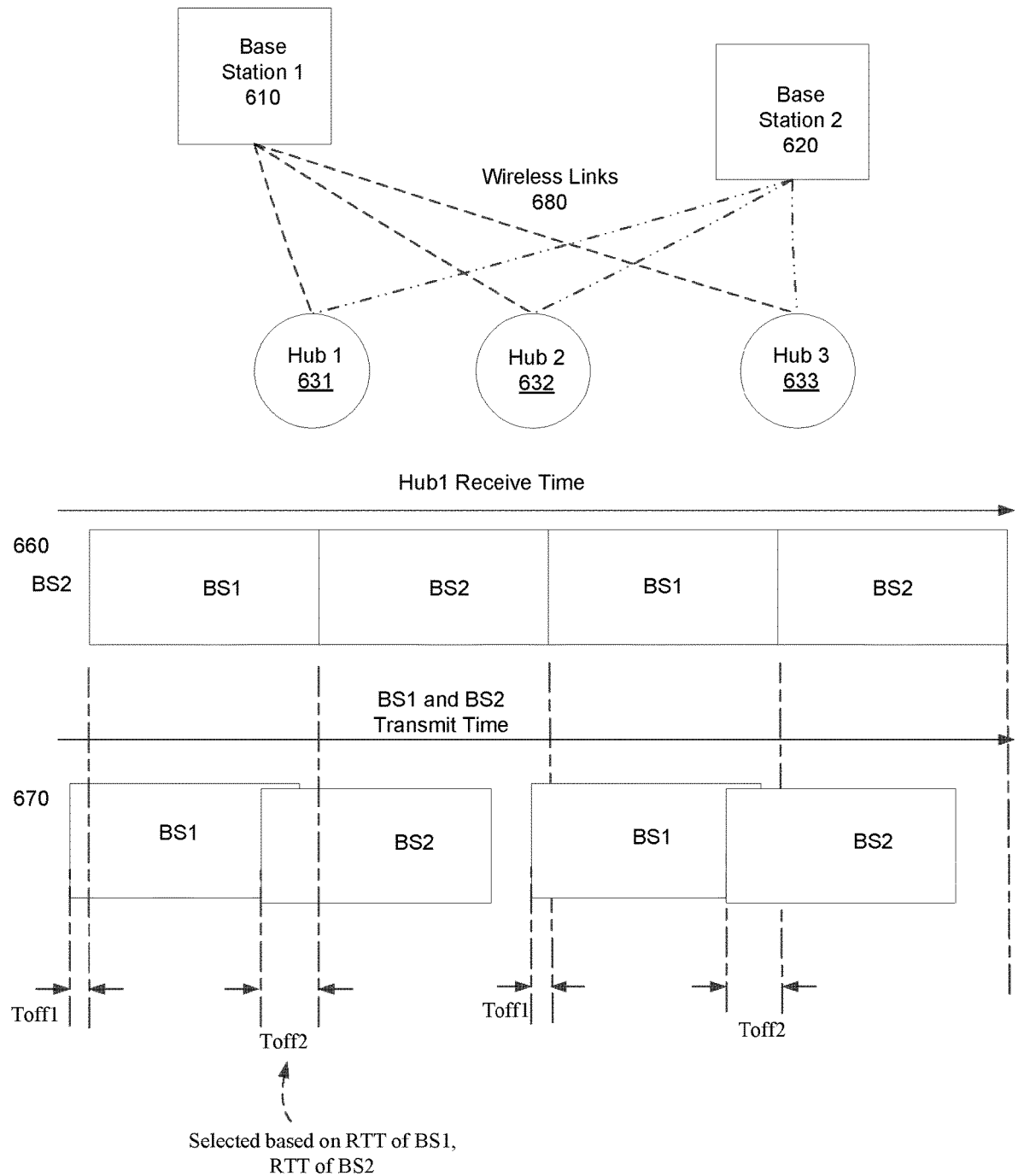
FIG. 6 shows some examples of a timing of base station transmission based on a channel sharing map, according to an embodiment.

FIG. 6 shows some examples of a timing of base station transmission based on a channel sharing map, according to an embodiment. The shared channel sharing map of FIG. 6 is generated for base station 1 610 and base station 2 620 which have overlapping coverage areas, wherein the hubs 631, 632, 633 are located within the coverage areas of the base station 1 610 and base station 2 620. The base stations BS1 610, BS2 620 wirelessly communicate with the hubs 631, 632, 633 through wireless links 680.

The channel sharing map 660 shows a sequence of time allocations of the base stations BS1 610 and BS2 620. Ideally, at for example hub1 631, the time of the reception of wireless communication from BS1 and BS2 are timed to efficiently utilized the transmission channel. That is, ideally when reception of wireless signals from BS1 stop, the reception of wireless signals from BS2 immediately starts, thereby most efficiently utilizing the transmission channel. Efficient use of the channel includes minimal dead time in which the hub 1 631 is not wirelessly communicating with either of the base stations BS1, BS2.

However, the communication delay from one base station to another base station will vary. Therefore, if the timing of the transmission of the wireless communication from the base stations BS1, BS2 is not precisely controlled, then the hub (Hub1) will have dead times in its wireless communication, and channel efficiency will be wasted.

The shared channel map 680 representation shows the timing of the transmissions from BS1 and BS2 being controlled to efficiently used the transmission channel. As shown, the transmission from BS1 and BS2 begins before the allocations indicated by the channel sharing map to account for the communication delay between each base station BS1, BS2 and the hub1. As shown, BS1 begins transmission at T0$f\!f$1 before the timing of BS1 of the channel sharing map 660. Toff1 accounts for the communication delay between BS1 and hub1. Further, BS2 begins transmission at Toff2 before the timing of BS2 of the channel sharing map 660. Toff2 accounts for the communication delay between BS2 and hub1. If properly timed, the wireless communication of BS1 stops being received by hub1 the same time that the wireless communication from BS 2 starts being received by hub1.

For at least some embodiments, each of the hubs will also have their own channel sharing maps which provide a timed schedule of wireless communication with the base stations. Similarly, the hubs need to time the transmission of wireless communication with the different base stations to minimize the downtime. As previously described, the propagation delay between a hub and different base stations will vary. Accordingly, the timing of the transmission to the different base station needs to be adjusted based on the propagation delay between the hub and the corresponding base station.

For an embodiment, the transmission from hub1 631 to BS1 and BS2 begins before the allocations indicated by the channel sharing map to account for the communication delay between the hub1 631 and each base station BS1, BS2. For example, hub1 631 may begin transmission at T0$f\!f$1 before the timing of the scheduled hub1 to BS1 of the channel sharing map of hub 1. Toff1 accounts for the communication delay between hub1 and BS1. Further, hub 1 begins transmission at Toff2 before the timing of the hub1 to BS2 of the channel sharing map of hub1. Toff2 accounts for the communication delay between hub1 and BS2.

Figure 7:
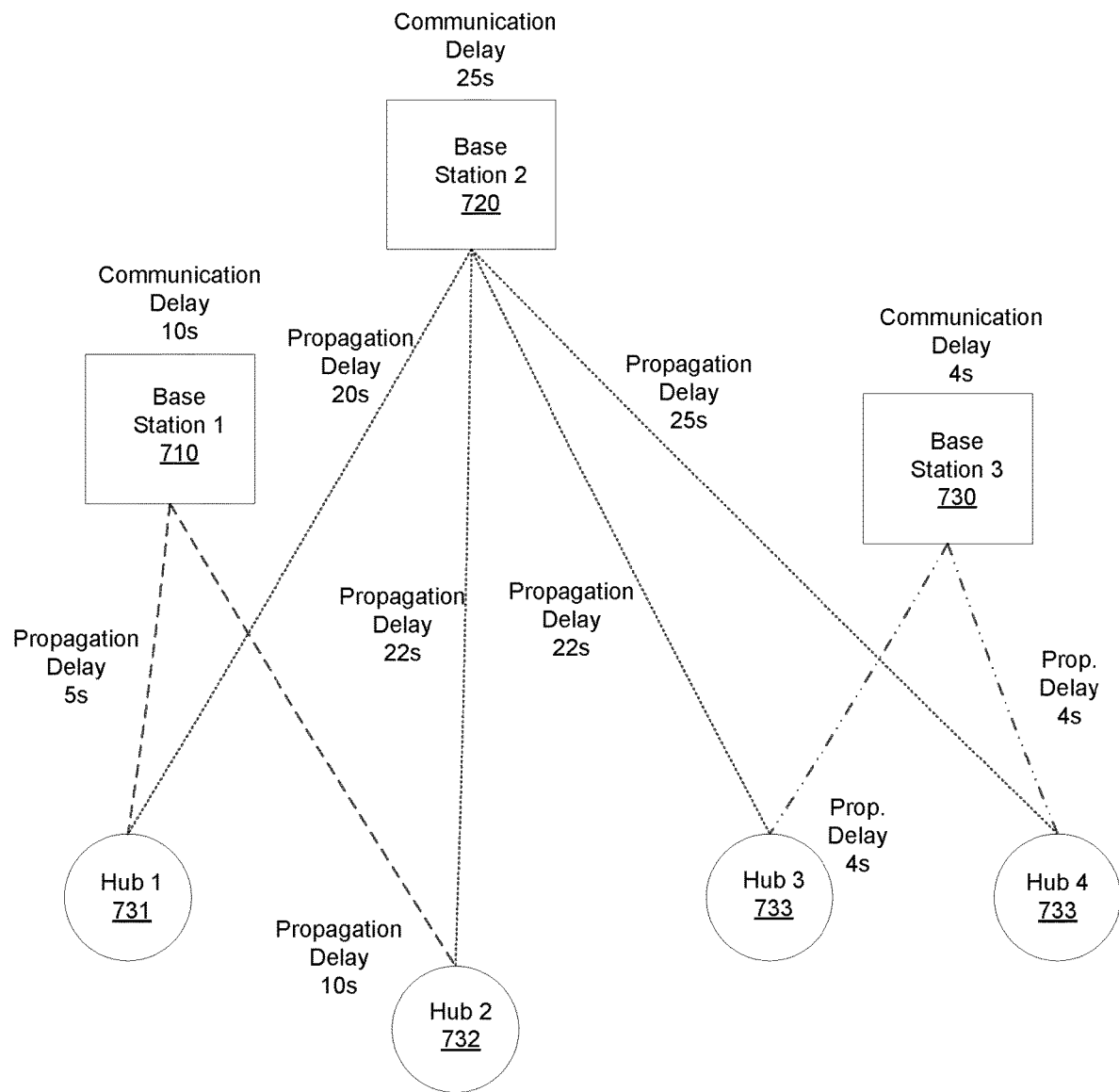
FIG. 7 shows multiple base stations wirelessly communicating with multiple hubs, and further shows the propagation times for each of the wireless links between the base stations and the hubs, and further shows selected communication delays, according to an embodiment.

FIG. 7 shows multiple base stations wirelessly communicating with multiple hubs, and further shows the propagation times for each of the wireless links between the base stations and the hubs, and further shows selected communication delays, according to an embodiment. As shown, a base station 1 710 has hubs 731, 732 within its coverage area, a base station 2 720 has hubs 731, 732, 733, 734 within its coverage area, and base station 3 730 has hubs 733, 734.

The propagation delays of the wireless links from the base station 1 710 to the 731, 732 are 5 s and 10 s. Therefore, the communication delay of the base station 1 710 is selected to be 10 s, the maximum propagation delay of the wireless links of the base station 1 710. The propagation delays of the wireless links from the base station 2 720 to the 731, 732, 733, 734 are 20 s, 22 s, 22 s, 25 s. Therefore, the communication delay of the base station 2 720 is selected to be 25 s, the maximum propagation delay of the wireless links of the base station 2 720. The propagation delays of the wireless links from the base station 3 730 to the 733, 734 are 4 s and 4 s. Therefore, the communication delay of the base station 3 730 is selected to be 4 s, the maximum propagation delay of the wireless links of the base station 3 730.

As previously described, each base station determines one or more discrete communication delays (that is, a communication delay for each base station) for the base station based upon a maximum propagation delay between the base station and one or more of the plurality of hubs. As described, for an embodiment, the discrete communication delays then are used to determine a channel sharing map in which the base stations time their transmissions based upon the channel sharing map to enable continuous reception of the signal at the hub As previously described, each base station operates to time wireless communication with the plurality of hubs based on the channel sharing map, the one or more discrete communication delays of the base station, and a communication delay of a preceding base station according to the channel sharing map. As shown in FIG. 6, each base station operates to adjust a transmission time of wireless data being transmitted to a hub based on the discrete communication delay of the base station, and a communication delay of the preceding base station Further, each of the plurality of hubs operate to coordinate a timing of uplink wireless communication to the base stations based upon the one or more discrete communication delays, a propagation delay of a one of the base stations, and the shared channel map.

Further, at least one of the plurality of hubs operates to maintain an estimate of roundtrip time (propagation delay) for each base station that the hub is within the coverage area of the base station, and the at least one of the plurality of hubs further operates to time communication with a current active base station based on the maintained estimate of the roundtrip delay (propagation delay) with the current active base station and the channel sharing map.

Figure 8:
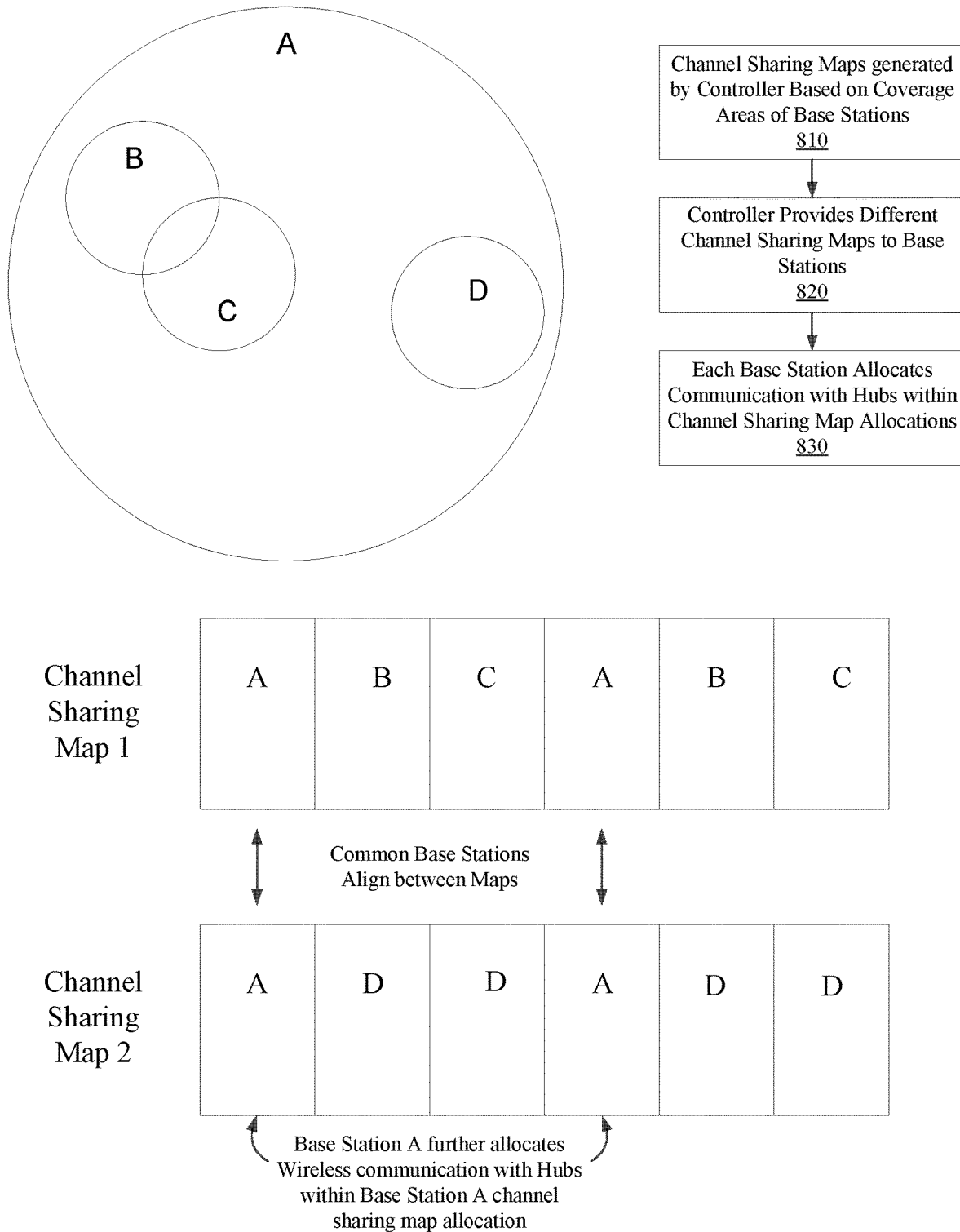
FIG. 8 shows overlapping coverage areas of multiple base stations and corresponding unique channel sharing maps, according to an embodiment.

FIG. 8 shows overlapping coverage areas of multiple base stations and corresponding unique channel sharing maps, according to an embodiment. The coverage areas of the base stations include coverage areas A, B, C, D. As previously described, the channel sharing map of each base station includes all the base stations that have overlapping coverage. For example, in FIG. 8, the coverage areas of A, B, and C overlap. Therefore, a first channel sharing map includes allocations to the base stations of A, B, and C. Further, the coverage areas of A and D overlap. Therefore, a second channel sharing includes allocations to the base stations of A and D.

The channel sharing maps 1 and 2 of FIG. 8 show possible base station allocations. It should be noted that channel sharing maps that include a common base station, such as, base station A need to be coordinated. That is, the timing of the common base station A needs to be commonly accounted for in both channel sharing maps, and occur at the same time allocations within the channel sharing maps 1 and 2.

The flow chart of FIG. 8 shows steps of the channel sharing maps. A first step 810 includes a controller generating the channel sharing maps based on the coverage areas of the base stations. A second step 820 includes the controller providing the channel sharing maps to the base stations. A third step 830 includes each base station further allocating (scheduling) wireless communication with hubs within the channel sharing map allocations. That is, the channel sharing map provides time allocations in which each base station communicates with the hubs. The base stations than allocate or time the communication with the hubs within the base station allocations of the shared channel maps. Essentially the base stations determine a fine-tuning of the timing (map within the channel sharing map) of wireless communication with the hubs that the base station is wirelessly communicating with within the allocation for the base station within the shared channel sharing map.

Figure 9:
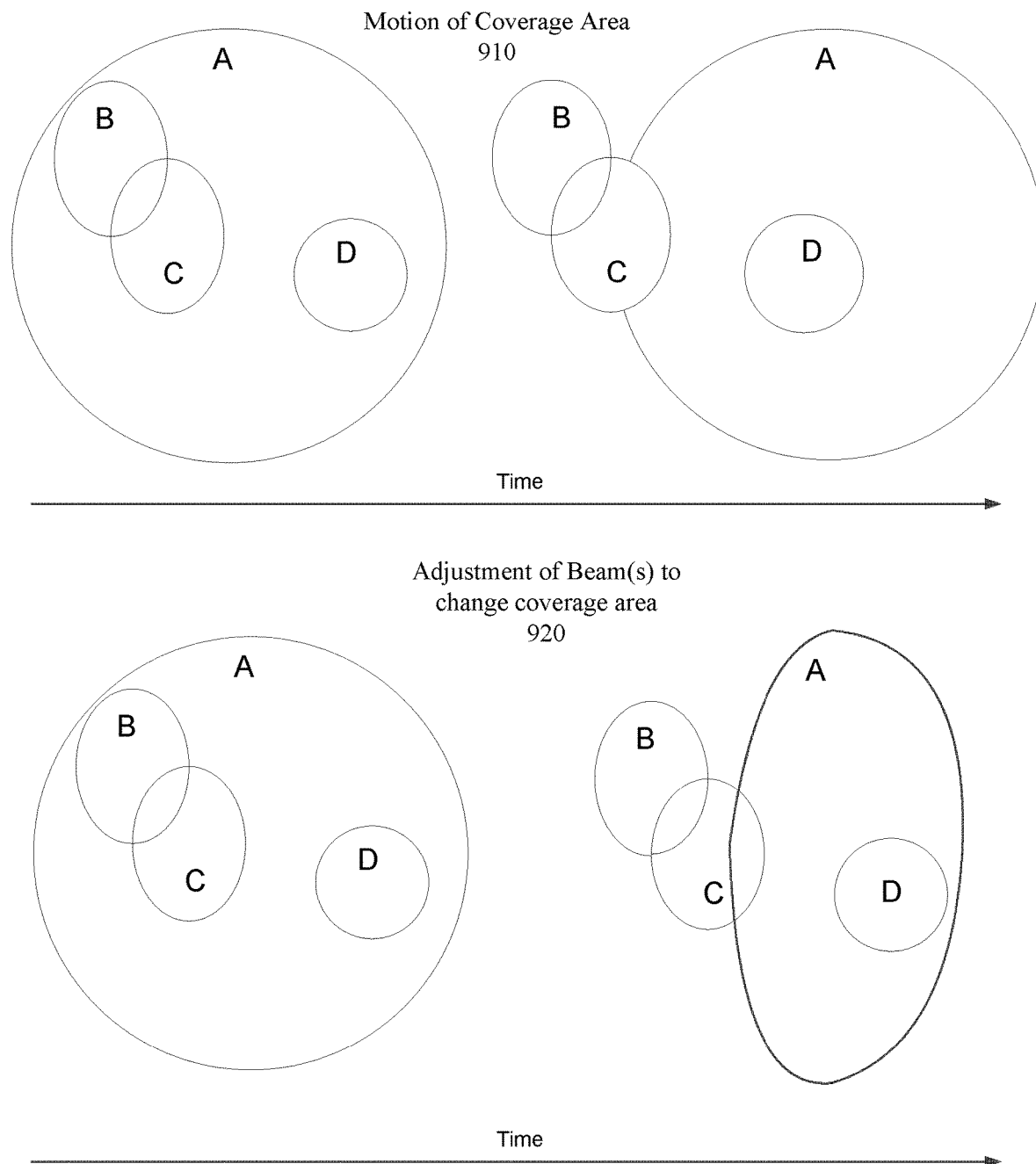
FIG. 9 shows coverage area of multiple base stations that change over time, according to an embodiment.

FIG. 9 shows coverage area of multiple base stations that change over time, according to an embodiment. First, the coverage area of one or more of the base stations may include motion. The motion of coverage area 910 of FIG. 9 shows the coverage area of base station A moving over time. The motion can be a function of time due to satellite motion.

The coverage areas of the base station can additionally or alternatively change over time as beamforming patterns of the base stations of the terrestrial and/or satellite networks change over time 920.

For at least some embodiments, the channel sharing maps are updated as the coverage areas of the base stations of the terrestrial and/or satellite networks change over time due to either motion of the transmitting elements (terrestrial and/or satellite base stations), or due to changes is coverage areas due to changes in beamforming parameters of electromagnetic beams formed by the transmitting elements (terrestrial and/or satellite base stations).

As previously described, the motion of the base stations can be determined or sensed by telemetry monitoring of the position, velocity, and orbit of the satellite and propagating that forward in time (for example, 1 week) to generate that unique network map. The beamforming parameters are set by each of the base stations, corresponding changes in the beamforming patterns of the base stations can accordingly be determined. Further, for at least some embodiments, feedback from the hubs is utilized to improve the coverage overlaps. For example, a received signal strength (RSSI) of signals received at a hub for different base stations can be monitored. The value of the RSSI and changes in the RSSI can be used to further refine the coverage overlaps.

FIG. 10 is a flow chart that includes steps of coordinated satellite and terrestrial channel utilization, according to an embodiment. A first step 1010 includes determining, by a controller one or more discrete communication delays for each base station based upon a maximum propagation delay for each base station and the one or more of the plurality of hubs. A second step 1020 includes generating, by the controller, a channel sharing map that includes a timing of communication between each base station and the one or more of the plurality of hubs. A third step 1030 includes communicating, by the controller, the channel sharing map to the plurality of base stations. A fourth step 1040 includes timing, by each of the plurality of base stations, wireless communication with the plurality of hubs based on the channel sharing map, the communication delay of the base station, and a communication delay of a preceding base station according to the channel sharing map.

As previously described, for an embodiment, the controller communicates the channel sharing map to one of more of the plurality of hubs through at least one of the base stations. As previously described, for an embodiment, the controller operates to control at least one of the plurality of base stations to broadcast the channel sharing map to one of more of the plurality of hubs. As previously described, for an embodiment, each of the plurality of hubs operate to coordinate a timing of uplink wireless communication to the base stations based upon the one or more discrete communication delays, a propagation delay of a one of the base stations, and the shared channel map.

As previously described, for an embodiment, at least one of the plurality of hubs operates to maintain an estimate of roundtrip time for each base station that the hub is within the coverage area of the base station, and the at least one of the plurality of hubs further operates to time communication with a current active base station based on the maintained estimate of the roundtrip delay with the current active base station and the channel sharing map.

As previously described, for an embodiment, at least one of the plurality of hubs maintains an estimate of frequency correction values needed to phase lock onto carriers of multiple base stations, and wherein the at least one of the plurality of hubs operates to select a frequency correction value based on the maintained estimates of the frequency correction values of a current active base station as identified by the channel sharing map.

As previously described, for an embodiment, the communication delays are determined by a base station based on a propagation delay determined by each of the plurality of hubs. As previously described, for an embodiment, the roundtrip delay of each hub is determined by each hub operating to receive a packet containing a first timestamp, wherein the packet was transmitted by the base station, and wherein the first timestamp represents a transmit time of the packet, receive from a local time source, a second timestamp corresponding with a time of reception of the packet with the first timestamp, calculate a time difference between the first timestamp and the second timestamp, and determine the roundtrip delay of the base station based on the calculated time difference. As previously described, for an embodiment, each hub operates to store the time difference between the first timestamp and the second timestamp, calculate a predictive model for predicting the propagation time based the time difference between the first timestamp and the second timestamp, and estimate the roundtrip delay between the base station and the hub at a time, comprising querying the predictive model with the time.

As previously described, for an embodiment, each base station has a defined coverage area, and wherein a unique channel sharing map is generated for each set of base stations having uniquely overlapping coverage areas. As previously described, for an embodiment, overlapping coverage areas of the base stations change over time, and the unique channel sharing map is adaptively updated based on the changes in the overlapping coverage areas.

Although specific embodiments have been described and illustrated, the embodiments are not to be limited to the specific forms or arrangements of parts so described and illustrated. The described embodiments are to only be limited by the claims.

What is claimed:

1. A controller of a wireless communication system operative to:
   determine one or more discrete communication delays for each base station of a plurality of base stations based upon a maximum propagation delay between each base station and one or more of a plurality of hubs;
   generate a channel sharing map that includes a timing of communication between each base station and the one or more of the plurality of hubs;
   communicate the channel sharing map to the plurality of base stations;
   wherein each of the plurality of base stations operates to:
   time wireless communication with the plurality of hubs based on the channel sharing map, and the one or more discrete communication delays of the base station.

2. The controller of claim 1, wherein at least one of the plurality of base stations communicates with at least one of the plurality of hubs through one or more satellite networks, or at least one of the plurality of base stations communicates with at least one of the plurality of hubs through one or more terrestrial networks.

3. The controller of claim 1, wherein maximum propagation delays of the plurality of base stations varies across the plurality of base stations with overlapping coverage areas by greater than a threshold amount.

4. The controller of claim 1, wherein the controller communicates the channel sharing map to one of more of the plurality of hubs through at least one of the base stations.

5. The controller of claim 4, wherein the controller operates to control at least one of the plurality of base stations to broadcast the channel sharing map to one of more of the plurality of hubs.

6. The controller of claim 4, wherein each of the plurality of hubs operate to coordinate a timing of uplink wireless communication to the base stations based upon the one or more discrete communication delays, a propagation delay of a one of the base stations, and the shared channel map.

7. The controller of claim 4, wherein:
   at least one of the plurality of hubs operating to maintain an estimate of roundtrip time for each base station that the hub is within the coverage area of the base station;
   the at least one of the plurality of hubs further operating to time communication with a current active base station based on the maintained estimate of the roundtrip delay with the current active base station and the channel sharing map.

8. The controller of claim 4, wherein:
   at least one of the plurality of hubs maintaining an estimate of frequency correction values needed to phase lock onto carriers of multiple base stations, and wherein the at least one of the plurality of hubs operates to select a frequency correction value based on the maintained estimates of the frequency correction values of a current active base station as identified by the channel sharing map.

9. The controller of claim 4, wherein:
   at least one of the plurality of hubs operating to maintain physical channel parameters needed to connect to carriers of multiple base stations, and wherein
   the at least one of the plurality of hubs operates to select a frequency correction value based on the maintained estimates of the physical channel parameters of a current active base station as identified by the channel sharing map.

10. The controller of claim 1, wherein channels of the channel sharing map occupy a common frequency spectrum.

11. The controller of claim 1, wherein the plurality of base stations and the plurality of hubs maintain synchronization through a global satellite network.

12. The controller of claim 1, wherein the one or more discrete communication delays are determined by a base station based on a propagation delay determined by each of the plurality of hubs.

13. The controller of claim 12, wherein the propagation delay of each hub is determined by each hub operating to:
   receive a packet containing a first timestamp, wherein the packet was transmitted by the base station, and wherein the first timestamp represents a transmit time of the packet;
   receive from a local time source, a second timestamp corresponding with a time of reception of the packet with the first timestamp;
   calculate a time difference between the first timestamp and the second timestamp; and
   determine the propagation delay of the base station based on the calculated time difference.

14. The controller of claim 13, wherein each hub operates to:
   store the time difference between the first timestamp and the second timestamp;
   calculate a predictive model for predicting the propagation time based the time difference between the first timestamp and the second timestamp; and
   estimate the propagation delay between the base station and the hub at a time, comprising querying the predictive model with the time.

15. The controller of claim 1, wherein generation of the shared channel map is influenced by the one or more discrete communication delays.

16. The controller of claim 15, wherein a timing a duration of allocation within the shared channel map are based on a difference in communication delays between preceding and subsequent base stations of the shared channel map.

17. The controller of claim 1, wherein each base station has a defined coverage area, and wherein a unique channel sharing map is generated for each set of base stations having uniquely overlapping coverage areas.

18. The controller of claim 17, wherein overlapping coverage areas of the base stations change over time, and the unique channel sharing map is adaptively updated based on the changes in the overlapping coverage areas.

19. The controller of claim 1, wherein a first base station and a second base station share core network and traffic from a hub when a wireless connection of the hub dynamically transfers from the first base station to the second base station.

20. A method, comprising:
- determining, by a controller, one or more discrete communication delays for each base station of a plurality of base stations based upon a maximum propagation delay between each base station and the one or more of a plurality of hubs;
- generating, by the controller, a channel sharing map that includes a timing of communication between each base station and the one or more of the plurality of hubs;
- communicating, by the controller, the channel sharing map to the plurality of base stations; and
- timing, by each of the plurality of base stations, wireless communication with the plurality of hubs based on the channel sharing map, and the one or more discrete communication delays of the base station.

\* \* \* \* \*